US011200189B2

(12) United States Patent
Kaler et al.

(10) Patent No.: US 11,200,189 B2
(45) Date of Patent: Dec. 14, 2021

(54) BASEBOARD MANAGEMENT CONTROLLER-BASED SECURITY OPERATIONS FOR HOT PLUG CAPABLE DEVICES

(71) Applicant: HEWLETT PACKARD ENTERPRISE DEVELOPMENT LP, Houston, TX (US)

(72) Inventors: Paul A. Kaler, Houston, TX (US); James T. Bodner, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/690,592

(22) Filed: Nov. 21, 2019

(65) Prior Publication Data
US 2021/0157760 A1 May 27, 2021

(51) Int. Cl.
G06F 1/12 (2006.01)
G06F 13/40 (2006.01)
G06F 13/42 (2006.01)
H04L 9/32 (2006.01)
H04L 9/08 (2006.01)

(52) U.S. Cl.
CPC ........... *G06F 13/4081* (2013.01); *G06F 1/12* (2013.01); *G06F 13/423* (2013.01); *H04L 9/0822* (2013.01); *H04L 9/3234* (2013.01)

(58) Field of Classification Search
CPC .................................. G06F 7/04; G06F 21/00
See application file for complete search history.

(56) References Cited

U.S. PATENT DOCUMENTS

| 9,734,093 | B2 | 8/2017 | Khemani et al. |
| 10,242,176 | B1 | 3/2019 | Sathyanarayana et al. |
| 10,698,844 | B1* | 6/2020 | Wigmore ............ G06F 13/4022 |
| 2010/0024001 | A1* | 1/2010 | Campbell ............... G06F 21/71 726/2 |
| 2011/0145634 | A1 | 6/2011 | Tabuchi et al. |
| 2013/0346756 | A1* | 12/2013 | Cook ...................... G06F 21/57 713/189 |

(Continued)

OTHER PUBLICATIONS

Intel, "Intel® Management Module, Technical Product Specification;" Revision 1.0.; Jun. 2005, pp. 1-213, 213 pp.

*Primary Examiner* — Getente A Yimer
(74) *Attorney, Agent, or Firm* — Trop, Pruner & Hu, P.C.

(57) ABSTRACT

A technique includes holding a bus interface of a removable device that is inserted into a connector of a computer system in a state to prevent the device from communicating with a communication link. The communication link is coupled to the connector and is associated with operating system access to the device. The method includes a baseboard management controller communicating with the device using a channel other than the communication link while the bus interface of the device is held in the state; the baseboard management controller performing a security operation corresponding to the device based on the communication with the device using the channel; and the baseboard management controller releasing the bus interface of the device from the state to allow the device to communicate with the communication link in response to the baseboard management controller completing the security operation.

11 Claims, 7 Drawing Sheets

(56) References Cited

U.S. PATENT DOCUMENTS

| | | | |
|---|---|---|---|
| 2013/0347103 A1* | 12/2013 | Veteikis | H04L 43/04 |
| | | | 726/22 |
| 2014/0020083 A1* | 1/2014 | Fetik | G06F 21/552 |
| | | | 726/11 |
| 2014/0130188 A1* | 5/2014 | Baryudin | G06F 21/44 |
| | | | 726/29 |
| 2016/0013944 A1* | 1/2016 | Offenberg | G06F 21/64 |
| | | | 713/176 |
| 2016/0227675 A1* | 8/2016 | North | G06F 1/20 |
| 2017/0206034 A1* | 7/2017 | Fetik | G06F 21/78 |
| 2017/0337140 A1 | 11/2017 | Ragupathi et al. | |
| 2019/0229901 A1* | 7/2019 | Elbaz | H04L 9/14 |

\* cited by examiner

BASEBOARD MANAGEMENT CONTROLLER-BASED SECURITY OPERATIONS FOR HOT PLUG CAPABLE DEVICES

BACKGROUND

A computer component may be connected to or removed from a computer system while the computer system remains powered up through a process called hot swapping, or hot plugging. In this manner, the computer system may have a hot plug capable connector into which a hot plug capable component may be inserted into (or "hot plugged") while the connector receives power, and conversely, the component may be removed from the connector while the connector receives power. Hot plugging is advantageous because a component may be added to or removed from the computer system without powering down and rebooting the computer system.

A self-encrypting drive is one example of a component that may have hot plug capabilities. A self-encrypting drive contains a cryptographic processor that performs encryption and decryption inside the drive so that the data stored in the drive is always encrypted. For write operations, the cryptographic processor converts plaintext data into corresponding ciphertext that is stored on the drive, and conversely, for read operations, the cryptographic processor converts the ciphertext into plaintext.

DETAILED DESCRIPTION

Figure 1:
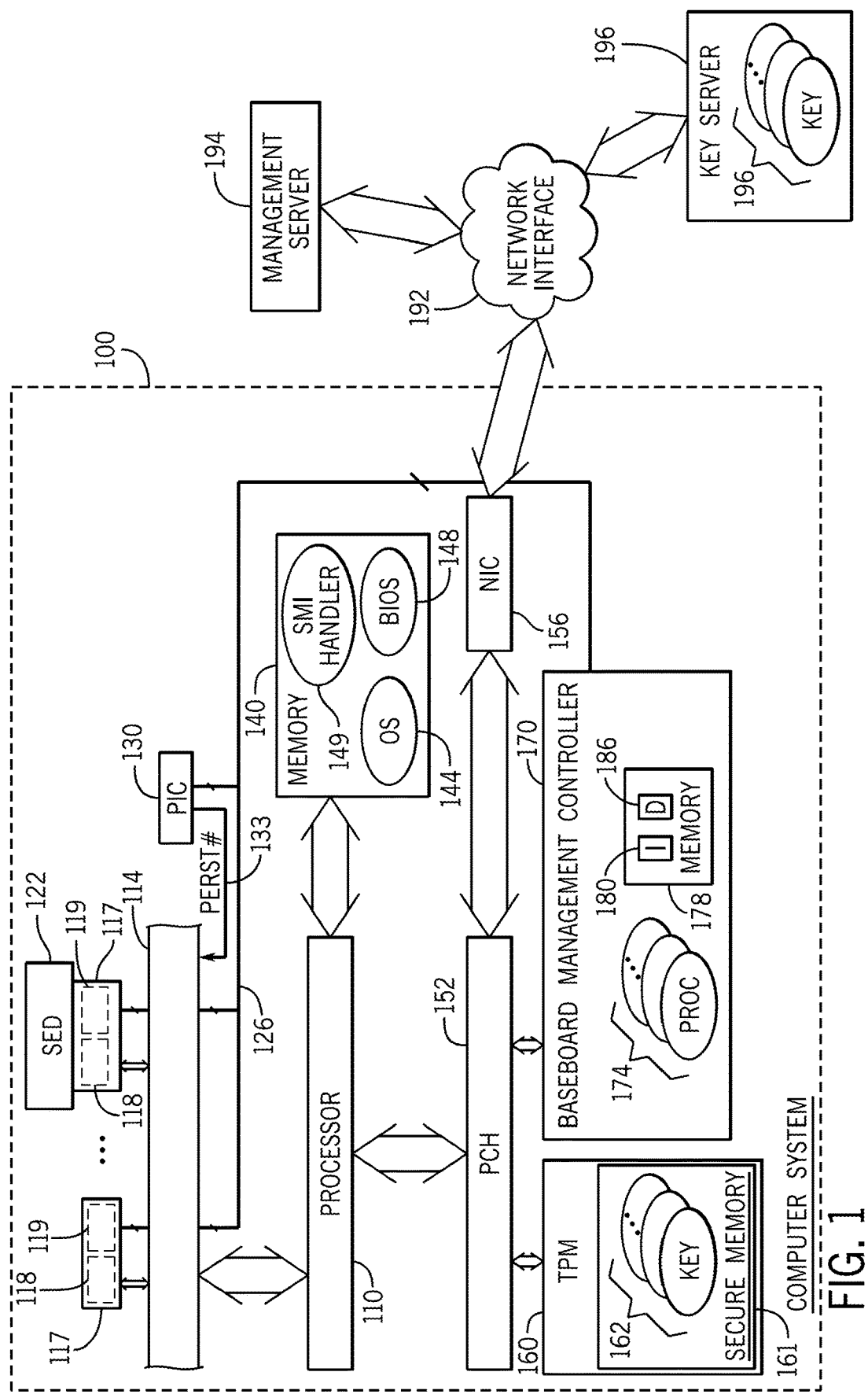
FIG. 1 is a schematic diagram of a computer network according to an example implementation.

When a host computer system detects a newly-installed, self-encrypting drive, the host computer system may perform one or multiple security operations before components of the system use the drive. For example, the host computer may retrieve a credential used to lock and unlock access to the self-encrypting drive and provide the credential to the drive. More specifically, a self-encrypting drive may internally store and use a media access key to encrypt and decrypt the data that is stored on the drive, and the media access key may be encrypted using a wrapping key, or "key encrypting key." The key encrypting key may be viewed as a password, which is provided by the host computer system to the self-encrypting drive to unlock access to the drive in that the drive cannot decrypt the media access key (and therefore use the media access key to encrypt and decrypt data) without the key encrypting key. The self-encrypting drive uses the key encrypting key to decrypt the media encryption key, and the drive does not store the key encrypting key. Accordingly, if the self-encrypting drive has been set up with a key encrypting key, the drive effectively cannot be used without this key being furnished to the drive after the drive powers up.

For a self-encrypting drive that is installed before power up, or boot up, of a computer system, firmware (e.g., basic input/output operating system (BIOS) or unified extensible firmware interface (UEFI) firmware) of the computer system may, at boot time, detect the self-encrypting drive and perform credential management for the drive. This credential management may include perform such actions as determining whether a key encrypting key has been set up for the drive; and if so, retrieving the key encrypting key and providing the key encrypting key to the drive.

The self-encrypting drive may be a hot plug capable device (also called a "hot plug device"), i.e., a drive that may inserted into a hot plug capable connector (also called a "hot plug connector," e.g., a PCIe U.3 non-volatile memory express (NVMe) drive bay); and the drive may be installed in the host computer system while the host computer system is powered up (i.e., after boot up of the host computer system). As such, the BIOS/UEFI firmware that is used for credential management at boot time of the host computer is unavailable. Consequently, the operating system of the host computer system may detect the self-encrypting drive but be unable to access the drive. In this manner, the operating system may attempt to communicate with the self-encrypting drive, but because the system did not provide the key encrypting key to the self-encrypting drive, the operating system cannot read data from the drive. As such, the operating system, due to its inability to access the drive, may fail the drive and cause a service event resulting in customer disruption and possibly an unjustified warranty return.

One solution to address the scenario in which a self-encrypting drive is hot plugged into a computer system after boot up of the computer system is for an operating system agent to perform the credential management (e.g., determine whether a key encrypting key has been set up for the drive; and if so, retrieve the key encrypting key and providing the key encrypting key to the drive). However, with this approach, the operating system agent is designed for a specific operating system. As such, this approach may be rather inflexible for purposes of developing a computer platform that may be used with many different types of operating systems. Moreover, such an operating system agent may be a significant maintenance item, as the agent is updated over time to track changes to the operating system. Additionally, for the case in which the key is stored externally to the computer system in a remote key server, the host operating system may not have access to the remote key server, as the remote key server may be on a private network that is not accessible to the host operating system.

In accordance with example implementations that are described herein, a baseboard management controller of a computer system performs one or multiple security operations for a hot plug capable device, such as a self-encrypting drive, in an operating system agnostic manner. More specifically, the baseboard management controller performs the security operation(s) while the self-encrypting drive is held in state (e.g., the PCIe interface of the drive is held in reset) so that the operating system does not detect or otherwise communicate with the drive while the security operation(s) are being performed. As a more specific example, when the self-encrypting drive is hot plugged into a hot plug connector of the computer system, a bus interface (e.g., a PCIe interface) of the drive may be held in reset, while a baseboard management controller of the computer system communicates with the drive over an out-of-band channel (or "side channel"). Through these out-of-band channel communications, the baseboard management controller may determine that the self-encrypting drive has been set up with a key encrypting key. The baseboard management controller may retrieve the key encrypting key and provide the key to self-encrypting drive via the out-of-band channel. The bus interface of the self-encrypting drive may then be released from reset, so that afterwards, the drive may be accessed via the bus and thus, may be detected by the operating system.

Credential management is just one example of a security operation that the baseboard management controller may perform for a removable hot plug capable device, such as a self-encrypting drive. As another example of security operation, the baseboard management controller may authenticate a device (such as, for example, a self-encrypting drive) that is hot plugged into a computer system before access to the device by other components (e.g., software and/or hardware components) of the computer system is allowed. This may be particularly advantageous for purposes of preventing a rogue device from being hot plugged into the computer and having access (even for a short period) to software and devices of the host computer system before the system otherwise recognizes that the device is untrusted and isolates the device from the rest of the system.

Although example implementations are described herein in which the baseboard management controller performs one or more security operations for a self-encrypting drive, a self-encrypting drive is just one example of a hot plug capable component. In general, the baseboard management controller may perform one or multiple security operations for a removable device that is hot plugged into the computer system. In accordance with example implementations, the removable device may be a storage device (e.g., a self-encrypting drive, a non-self-encrypting drive, a flash memory card, a solid state drive (SSD), a storage accelerator card, and so forth) or a non-storage device (e.g., a device whose primary function is not to store data but rather, perform another function, such as a hot plug capable network interface controller (NIC) card).

As used herein, a baseboard management controller is a specialized service processor that monitors the physical state of a server or other hardware using sensors and communicates with a management system through a management network. The baseboard management controller may also communicate with applications executing at the operating system level through an input/output controller (IOCTL) interface driver, a representational state transfer (REST) application program interface (API), or some other system software proxy that facilitates communication between the baseboard management controller and applications. The baseboard management controller may have hardware level access to hardware devices located in a server chassis including system memory. The baseboard management controller may be able to directly modify the hardware devices. The baseboard management controller may operate independently of the operating system of the system in which the baseboard management controller is disposed. The baseboard management controller may be located on the motherboard or main circuit board of the server or other device to be monitored. The fact that a baseboard management controller is mounted on a motherboard of the managed server/hardware or otherwise connected or attached to the managed server/hardware does not prevent the baseboard management controller from being considered "separate" from the server/hardware. As used herein, a baseboard management controller has management capabilities for sub-systems of a computing device, and is separate from a processing resource that executes an operating system of a computing device. The baseboard management controller is separate from a processor, such as a central processing unit, executing a high level operating system or hypervisor on a system.

In accordance with example implementations, the self-encrypting drive is constructed to plug into a PCIe hot plug connector. In addition to containing contacts corresponding to the PCIe bus, the connector also contains contacts that corresponding to an out-of-band, or side channel (e.g., a system management bus (SMBus) or an Inter-Integrated ($I^2C$) bus), relative to the PCIe bus. The baseboard management controller and self-encrypting drive are constructed to communicate over the side channel. In accordance with example implementations, the PCIe bus is the main communication path for the self-encrypting drive, and in general, central processing units (CPUs) of the computer system may communicate with the drive via the PCIe bus.

In addition to PCIe hot plug connectors, the backplane of the computer system may include a peripheral interface controller (PIC) (e.g., a microcontroller) that regulates the state of the self-encrypting drive when the drive is first hot plugged into a PCIe connector. For example, in accordance with example implementations, the peripheral interface controller may control the assertion and de-assertion of a signal (called the "PERST # signal") that is communicated to the PCIe connector. The assertion of the PERST # signal in a PCIe connector instructs the self-encrypting drive (which is inserted in the PCIe connector) to maintain its PCIe interface in reset. In general, the peripheral interface controller may assert the PERST # signal for empty PCIe connectors so that when a hot plug capable PCIe device, such as a self-encrypting drive, is hot plugged into the connector, the PCIe interface of the device initially remains in reset to allow stabilization of the power and clock signals, which may be, in general, relatively unstable due to the hot plugging event. In one approach, the peripheral interface controller may implement a timer function to maintain the assertion of the PERST # signal for a predetermined duration to allow for clock and power signal stabilization; and at the expiration of the timer, the peripheral interface controller may de-assert the PERST # signal to allow the PCIe interface of the hot plug capable PCIe device to come out of reset. In accordance with example implementations that are described herein, the baseboard management controller communicates with the peripheral interface controller to impart an additional function to the PERST # signal: the PERST # signal holds the PCIe interface of the hot plugged PCIe device in reset until the baseboard management controller communicates with the device over the out-of-band channel to perform one or multiple security operations for the storage device, such as a credential management related operation and/or an authentication related operation.

Therefore, in accordance with example implementations, when a removable device, such as a self-encrypting drive, is first hot plugged into a hot plug connector, the asserted PERST # signal maintains the PCI interface of the device in reset, thereby preventing the operating system from communicating with the device. In accordance with example implementations, while the PERST # signal is being asserted to hold the self-encrypting drive in reset, the baseboard management controller uses the out-of-band channel to communicate with the drive for purposes of performing one or more security operations. For example, in accordance with example implementations, the baseboard management controller may first attempt to authenticate the self-encrypting drive; and if the baseboard management controller authenticates the drive, the baseboard management controller may determine if the drive has been set up with a key encrypting key, and if so, the baseboard management controller may retrieve the key encrypting key and provide the key to the drive. In accordance with example implementations, when the baseboard management controller completes the security operation(s), the baseboard management controller may communicate a command to the peripheral interface controller, which instructs the peripheral interface controller to release the hold on the PERST # signal. Consequently, the peripheral interface controller de-asserts the PERST # signal, which instructs the self-encrypting drive to bring its PCIe interface out of reset and begin PCI link training. At the conclusion of the link training, the self-encrypting drive may then be accessed by the operating system.

It is noted that the bus that serves as the main communication path for the removable device may be a bus other than a PCIe bus, in accordance with further example implementations. A PCIe bus is an example of a serial communication link. A serial communication link is a point-to-point communication channel between the ports of a pair of end point devices. A serial communication link may contain one or multiple lanes. A lane refers to communication lines of the serial communication link; and for a multiple lane link, packets of data that are communicated between the end point devices may be striped across the multiple lanes. The end point devices may negotiate the physical parameters (e.g., the number of lanes, or width, of the link; the link data rate; lane polarity; and so forth) that are be used for the link by communicating ordered sets of data (called "training sets") with each other during a process called "link training."

Referring to FIG. 1, as a more specific example, a computer network includes a host computer system 100 that includes one or multiple hot plug capable connectors 117 (or "hot plug connectors 117") in which removable hot plug capable devices (or "hot plug devices" or "removable devices") may be hot plugged into or un-hot plugged from while the computer system 100 remains powered up. For the example implementation that is depicted in FIG. 1, a self-encrypting drive 122, a hot plug capable device, has been installed in a connector 117. It is noted that although the self-encrypting drive 122 is described herein, the systems and techniques that are described herein are applicable to removable devices other than self-encrypting drives.

The hot plug connector 117 includes a bus communication path 118, i.e., communication contacts that correspond to power, clock, control and data signals of a bus 114, such as a PCIe bus; and the hot plug connector 117 includes another communication path 119 for out-of-bound channel communications, i.e., additional communication contacts that correspond to power and control/data signaling communication lines of an out-of-band, or side channel 126, which is a separate communication bus from the bus 114. As an example, in accordance with some implementations, the side channel 126 may be an Inter-Integrated Circuit ($I^2C$) bus or a system management bus (SMBus). As also depicted in FIG. 1, a baseboard management controller 170 and a peripheral interface controller 130 of the computer system 100 may be bus agents of the side channel 126 (i.e., may communicate with each other using the side channel 126).

In accordance with example implementations, the computer system 100 may include one or multiple processors 110, such as one or multiple central processing units (CPUs) packages, which include one or multiple CPU processing cores. In general, the processor 110 contains an interface to the serial bus 114, which allows the CPU processing core(s) of the processor 112 to access the serial bus 114 and access devices that are installed in the connectors 117. Moreover, the processor 110 may contain a memory bus interface, which allows the processing core(s) to access instructions that are stored in system memory 140, such as operating system instructions 144, BIOS/UEFI instructions 149, system management interrupt (SMI) handlers, and so forth. The processor 110 may further include an interface to an input/output (I/O) bridge, or peripheral component hub (PCH) 152.

In general, the memory 140 represents a collection of volatile and non-volatile memory devices. The memory 140 is a non-transitory memory that may be associated with any of a number of memory storage technologies, such as, for example, semiconductor-based memory storage technologies, memristor memory technologies, phase change memory technologies, a combination of one or more of the foregoing memory storage technologies, and so forth.

In general, the PCH 152 may establish communication to various components of the computer system 100, such as one or multiple peripherals (e.g., a network interface controller (NIC) 156, keyboard, a mouse, and so forth); a trusted platform module (TPM) 160; and the baseboard management controller 170. As depicted in FIG. 1, the TPM 160 may include a secure memory 161 that stores data representing various keys 162. Some of these keys may be key encrypting keys for self-encrypting drives, such as the key for self-encrypting drive 122. In this manner, the memory 161 may store data associating each of the keys 162 with a particular component, such as, for example, data representing an identifier or serial number of the component. The TPM 160 is an example of a security component of the computer system 100 which has a secure memory for storing keys. Examples of TPMs that may be used are commercially available from INFINEON TECHNOLOGIES® and NUVOTON®. Other examples of security components include a firmware-based security co-processor, such as a TPM implemented in ARM TRUSTZONE® commercially available from ARM LIMITED® out of Cambridge, UK or INTEL® SGX commercially available from INTEL® out of Santa Clara, Calif., which can be, for example, part of the processor 110-1. In accordance with further example implementations, the computer system 100 may contain a security component other than a TPM, such as a hardware security module (HSM), for example.

In general, in accordance with example implementations, the baseboard management controller 170 may be a microcontroller that includes one or multiple processors 174 (e.g., one or multiple CPU cores) and a memory 178. In general, the memory 178 represents volatile as well as non-volatile memory for the baseboard management controller 170, and the memory 178 may be formed from one or multiple semiconductor non-transitory storage devices, as well as any of the other storage devices mentioned above for memory 140. In general, the memory 178 stores machine executable instructions 180, which may be executed by the baseboard management controller 170 to perform one or multiple functions for the baseboard management controller 170 that are described herein. Moreover, the memory 178 may store data 186, where the data 186 may be, as examples, parameters and variables used for the communication with hot plug capable devices that are hot plugged into the connectors 117, such as the self-encrypting drive 122, to perform credential management for the devices; parameters and variables used to authenticate hot plug capable devices that are hot plugged into the connectors 117, such as the self-encrypting drive 122; and so forth. Moreover, in accordance with some implementations, at least part of the memory 178 may be a secure key store for storing keys, such as, for example, the key encrypting keys used by self-encrypting drives. Thus, many implementations are contemplated, which are within the scope of the appended claims.

As depicted in FIG. 1, the baseboard management controller 170 may, via the network interface 156, be connected to network fabric 192 for purposes of communicating with various components that are external to the computer system 100, such as a management server 194, a key server 196, and so forth. In general, the network fabric 192 may include components and use protocols that are associated with one or multiple types of communication networks, such as (as examples) Fibre Channel networks, iSCSI networks, ATA over Ethernet (AoE) networks, HyperSCSI networks, Gen-Z fabrics, dedicated management networks, local area networks (LANs), wide area networks (WANs), global networks (e.g., the Internet), wireless networks, or any combination thereof.

In accordance with some implementations, the key server 196 may serve as an external secure data store for one or multiple keys 197, such as key encrypting keys for self-encrypting drives, for example. Depending on the particular implementation, key encrypting keys for self-encrypting drives may be stored locally in the computer system 100 (i.e., stored in, for example, the TPM 160 or in the memory 178 of the baseboard management controller 170), or the keys may be stored externally with respect to the computer system 100, such as in the memory of the key server 196, for example.

Figure 2:
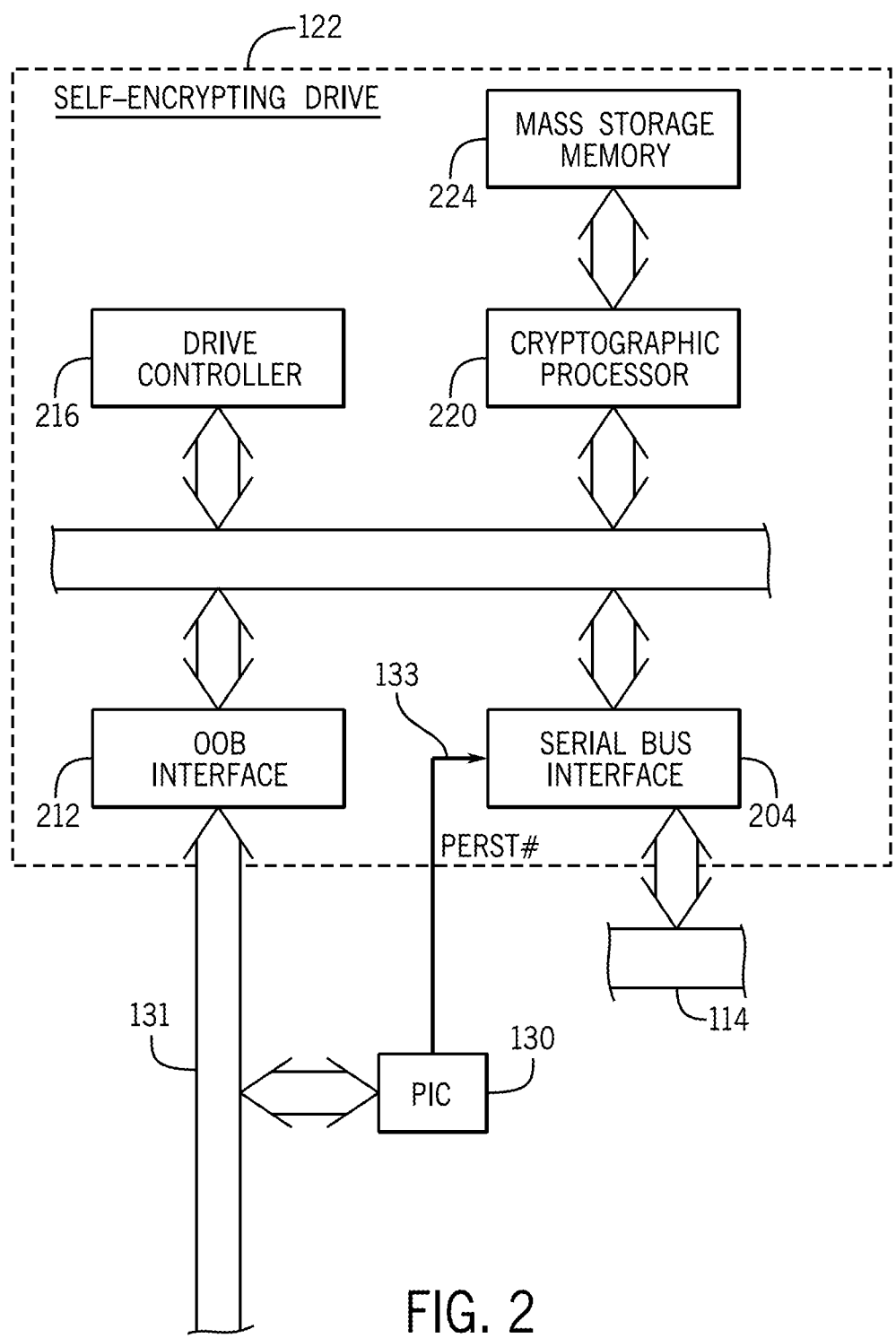
FIG. 2 is a schematic diagram of a self-encrypting drive according to an example implementation.

In accordance with example implementations, the peripheral interface controller 130 asserts a PERST # signal (depicted for a connector specific PERST # communication line 133 in FIG. 1) for a given hot plug connector 117 when the connector 117 is empty. Therefore, when a removable device, such as the self-encrypting drive 122, is hot plugged into the hot plug connector 172, the asserted PERST # signal keeps the device's interface to the bus 114 in reset. More specifically, referring to FIG. 2 in conjunction with FIG. 1, the self-encrypting drive 122 may have a serial bus interface 204, which, when the drive 122 is inserted into the connector 117 is in communication with the bus communication path 118 of the connector 117. The serial bus interface 204, when the self-encrypting drive 122 is inserted into the connector 117, is also connected to the communication line 133 that provides the PERST # signal. The PERST # signal is asserted when the self-encrypting drive 120 is first installed in the connector 117, which maintains the serial bus interface 204 in reset and in accordance with example implementations, does not allow the serial bus interface 204 to perform PCIe link training.

In addition to the serial bus interface 204, the self-encrypting drive 120 includes an out-of-bound channel interface 212, such as an I²C or SMBus interface, for purposes of communicating with the side channel 126. In accordance with example implementations, a drive controller 216 of the self-encrypting drive 120 is constructed to communicate with the baseboard management controller 170 via the side channel 126 while the serial bus interface 204 is held in reset. For example, this communication may involve the drive controller 216 communicating with the baseboard management controller 170 to inform the baseboard management controller 170 that key encrypting key has been set up for the self-encrypting drive 120, and the drive controller 216 may provide a serial number or unique identifier for the self-encrypting drive 120, which, the baseboard management controller 170 may use to search for the key encrypting key.

These initial communications may also involve the drive controller 216 informing the baseboard management controller 170 that the self-encrypting drive 120 has not been set up with a key encrypting key, and accordingly, in accordance with example implementations, the baseboard management controller 170 may cause a key encrypting key to be generated. The communications over the side channel 126 may further involve the baseboard management controller 170 providing the retrieved/generated key encrypting key to the drive controller 216. The drive controller 216 may then, in accordance with example implementations, provide the key encrypting key to a cryptographic processor 220, which decrypts a media encryption key and then uses the decrypted media encryption key to encrypt data that is stored in a mass storage memory 224 (solid state drive memory or magnetic storage, as examples) and decrypt data retrieved from the mass storage memory 224.

In accordance with example implementations, the communications between the baseboard management controller 170 and the drive controller 216 may also involve communications pertaining to the authentication of the self-encrypting drive 120, as further described herein.

At the conclusion of the security operations, the baseboard management controller 170 may communicate a command to the peripheral interface controller 130, via the side channel 126, to instruct the peripheral interface controller 130 to release the reset hold on the serial bus interface 204, i.e., instruct the peripheral interface controller 130 to de-assert the PERST # signal. In accordance with example implementations, in response to the de-assertion of the PERST # signal, the serial bus interface 204 is brought out of reset, begins link training on the serial bus 113 and thereafter may communicate signals to and from the serial bus 114 for the self-encrypting drive 120.

Figure 3:
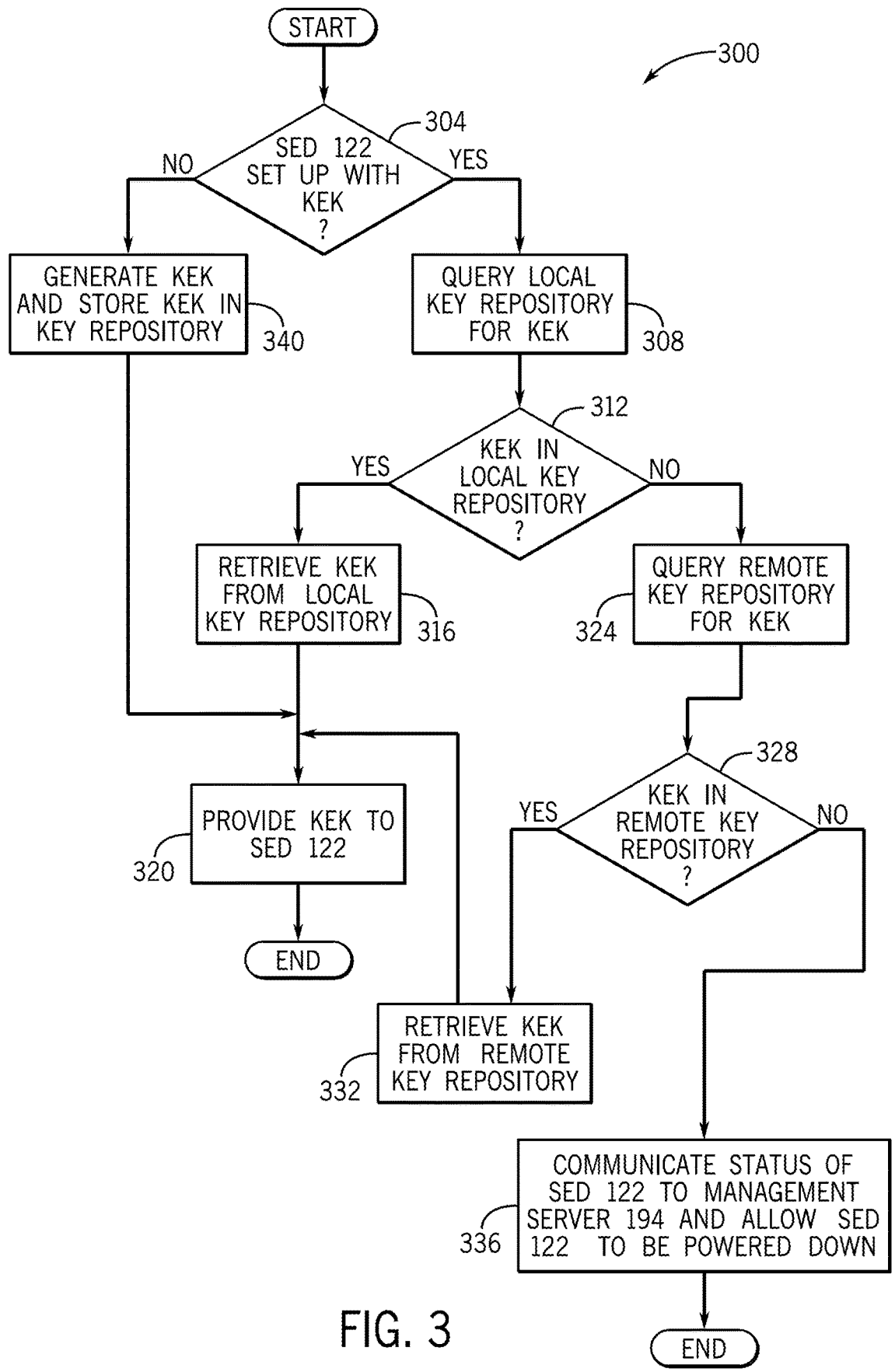
FIG. 3 is a flow diagram of a key management process performed by a baseboard management controller for a self-encrypting drive according to an example implementation.

FIG. 3 depicts a credential management technique 300 that the baseboard management controller 170 may perform for a self-encrypting drive 122 in response to a hot plug event in which the drive 122 is inserted into the connector 117. It is noted that, depending on the particular implementation, the baseboard management controller 170 may poll a memory of the peripheral interface controller 130 to detect the hot plug event, or the baseboard management controller 170 may respond to an interrupt that the peripheral interface controller 130 generates in response to the peripheral interface controller's detecting of the hot plug event. In general, in accordance with example implementations, the technique 300 is performed while the PERST # signal remains asserted (i.e., the technique 300 is performed while the serial bus interface 204 of the self-encrypting drive 122 is held in reset).

Referring to FIG. 3 in conjunction with FIG. 1, pursuant to the technique 300, the baseboard management controller 170 communicates with the self-encrypting drive 122 to determine (decision block 304) whether the self-encrypting drive 122 has been set up with a key encrypting key. If the self-encrypting drive 122 has not been set up with a key encrypting key, then, in accordance with example implementations, a key encrypting key is generated for the self-encrypting drive 122 an stored in a key repository, pursuant to block 340. As an example, in accordance with some implementations in which keys for self-encrypting drives are stored locally, the baseboard management controller 170 may, initiate a system management interrupt (SMI), and an SMI handler may then, in a system management mode (SMM) of the computer system 100, cause the TPM 160 to generate the key encrypting key for the drive 122, store the key in the secure memory 161 of the TPM 160 and provide the key to the baseboard management controller 170 via a secure channel. As another example, in accordance with some implementations in which keys for self-encrypting drives are stored externally, the baseboard management controller 170 may communicate with the remote key server 196, the key server 196 to cause the external key server 196 to generate the key encrypting key for the drive 122, store the key in the key server 196 and provide the key to the baseboard management controller 170.

If the baseboard management controller 170 determines (decision block 304) that the self-encrypting drive 122 has been set up with a key encrypting key, then the baseboard management controller 170 initiates a search process to find the key for the self-encrypting drive 122. It is noted that in the search, the baseboard management controller 170 uses a unique identifier for the self-encrypting drive 122, such as a serial number of the self-encrypting drive 122.

Pursuant to block 308, the baseboard management controller 170 queries a local key repository for the key encrypting key. In this context, the "local" key repository refers to a secure key storage within the computer system 100. For example, in accordance with some implementations, the local key repository may be a secure memory of the baseboard management controller 170. In accordance with further example implementations, the local key repository may be a secure memory inside a security component of the computer system 100, such as, for example, the memory 161 of the TPM 160. For the latter implementation in which the key encrypting key is stored in the TPM 160, the baseboard management controller 170 may, for example, issue an SMI, which causes the UEFI/BIOS query the TPM 160 for the key encrypting key, and the UEFI/BIOS may then securely pass the key encrypting key back to the baseboard management controller 170 via a secure API. Thus, if the key encrypting key is determined (decision block 312) to be in the local key repository, then the baseboard management controller 170 retrieves (block 316) the key encrypted key from the local key repository and provides (block 320) the key encrypting key to the self-encrypting drive 122.

If, however, the baseboard management controller 170 determines (decision block 312) that the key encrypting key is not in a local key repository, then, in accordance with example implementations, the baseboard management controller 170 queries (block 324) a remote key repository for the key encrypting key. For example, in accordance with some implementations, the baseboard management controller 170 may communicate with an external key repository, such as key server 196, for purposes of determining whether the key encrypting key for the self-encrypting drive 122 is stored in the remote repository. If a determination is made (decision block 328) that the key encrypting key is in the remote key repository, then the baseboard management controller 170 retrieves (block 332) the key encrypting key from the remote key repository and provides the key encrypting key to the self-encrypting drive 122, as depicted in block 320.

In accordance with example implementations, if the baseboard management controller 170 is unable to find the key encrypting key for the self-encrypting drive 122, then the baseboard management controller 170, pursuant to block 336, communicates the status of the self-encrypting drive 122 to the management server 194 (via a message to the server 194, for example). In accordance with some implementations, the management server 194 may then communicate with the host computer system 100 to power down the self-encrypting drive 122, as depicted in block 336. However, in accordance with further example implementations, the management server 194 may, via a user interface (e.g., a graphical user interface (GUI)) on the server 194, allow a user to intervene by importing or entering the key encrypting key in the user interface; and the management server 194 may then communicate the key encrypting key that is provided by the user to the baseboard management controller 170 so that the controller 170 may provide the key encrypting key to the self-encrypting drive, pursuant to block 320.

Figure 4:
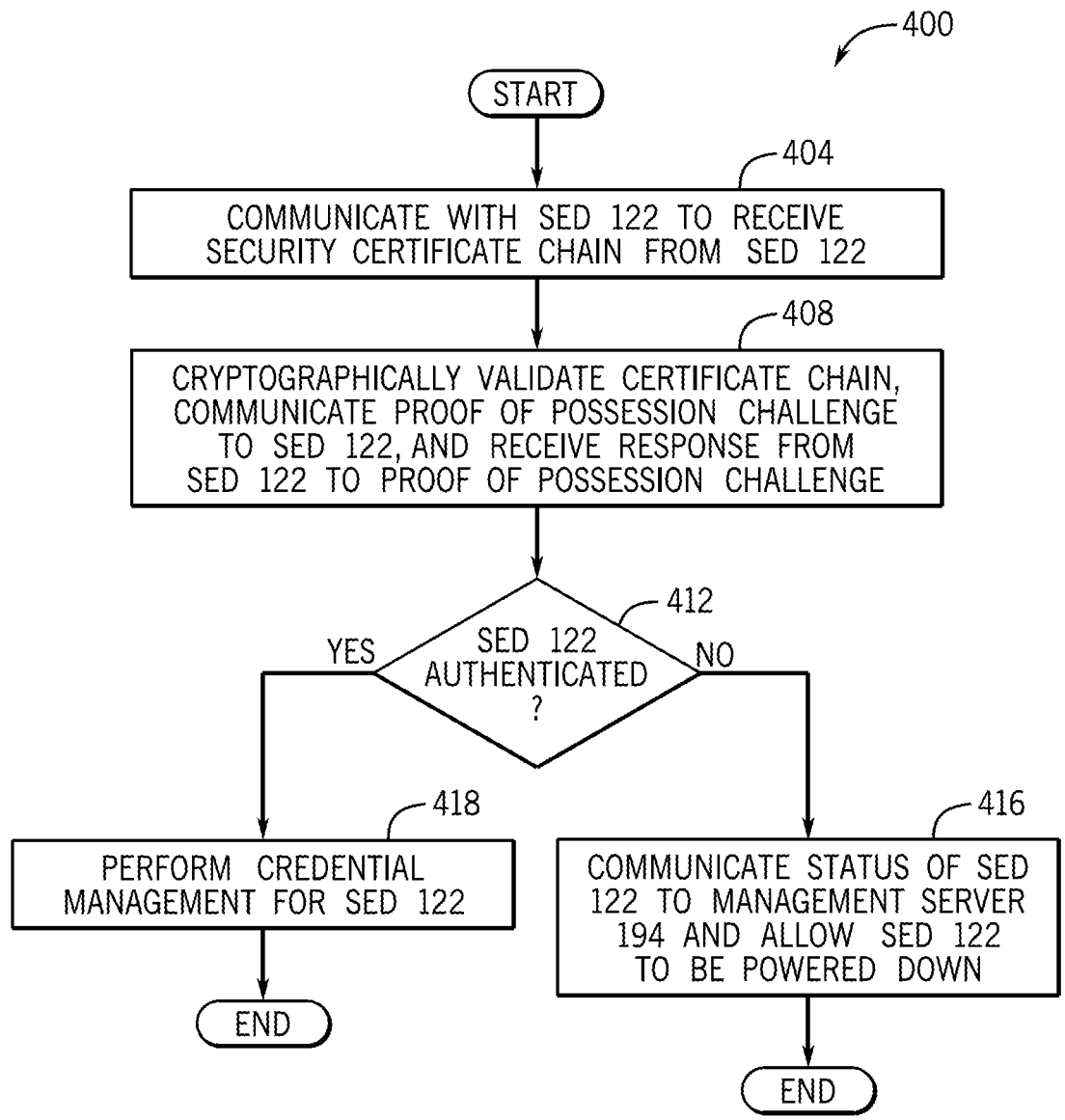
FIG. 4 is a flow diagram depicting an authentication process performed by a baseboard management controller to authenticate a self-encrypting drive according to an example implementation.

FIG. 4 depicts an example authentication process that may be used by the baseboard management controller 170 for purposes of authenticating a device, such as a self-encrypting drive 122, that is hot plugged into a connector 117, in accordance with example implementations. It is noted that although FIG. 4 depicts a technique to authenticate the self-encrypting drive 122, the technique may be used to authenticate other devices (e.g., storage devices other than self-encrypting drives and devices other than storage devices) and that are connected to the computer system via the system's hot plug connectors. Referring to FIG. 4 in conjunction with FIG. 1, pursuant to the technique 400, the baseboard management controller 170 communicates (block 404) with the self-encrypting drive 122 to receive a security certificate chain (e.g., an X.509 certificate chain) from the self-encrypting drive 122. The baseboard management controller 170 then, pursuant to block 408, cryptographically validates the certificate chain, communicates a proof of possession challenge to the self-encrypting drive 122 and receives a response from the self-encrypting drive 122 to the proof of possession challenge.

If the baseboard management controller 170 is unable to cryptographically validate the certificate chain or the response from the self-encrypting drive 122 to the proof of possession challenge is invalid, then, pursuant to decision block 412, the baseboard management controller 170 determines that the self-encrypting drive 122 is not authenticated, communicates (block 416) the failure of the baseboard management controller 170 to authenticate the self-encrypting drive 122 to the management server 194, and allows the self-encrypting drive 122 to be powered down. Otherwise, if, pursuant to decision block 412, the baseboard management controller 170 authenticates the self-encrypting drive 122, then, in accordance with example implementations, the baseboard management controller 170 proceeds to perform credential management for the self-encrypting drive 122, pursuant to block 418, as further described above.

Figure 5:
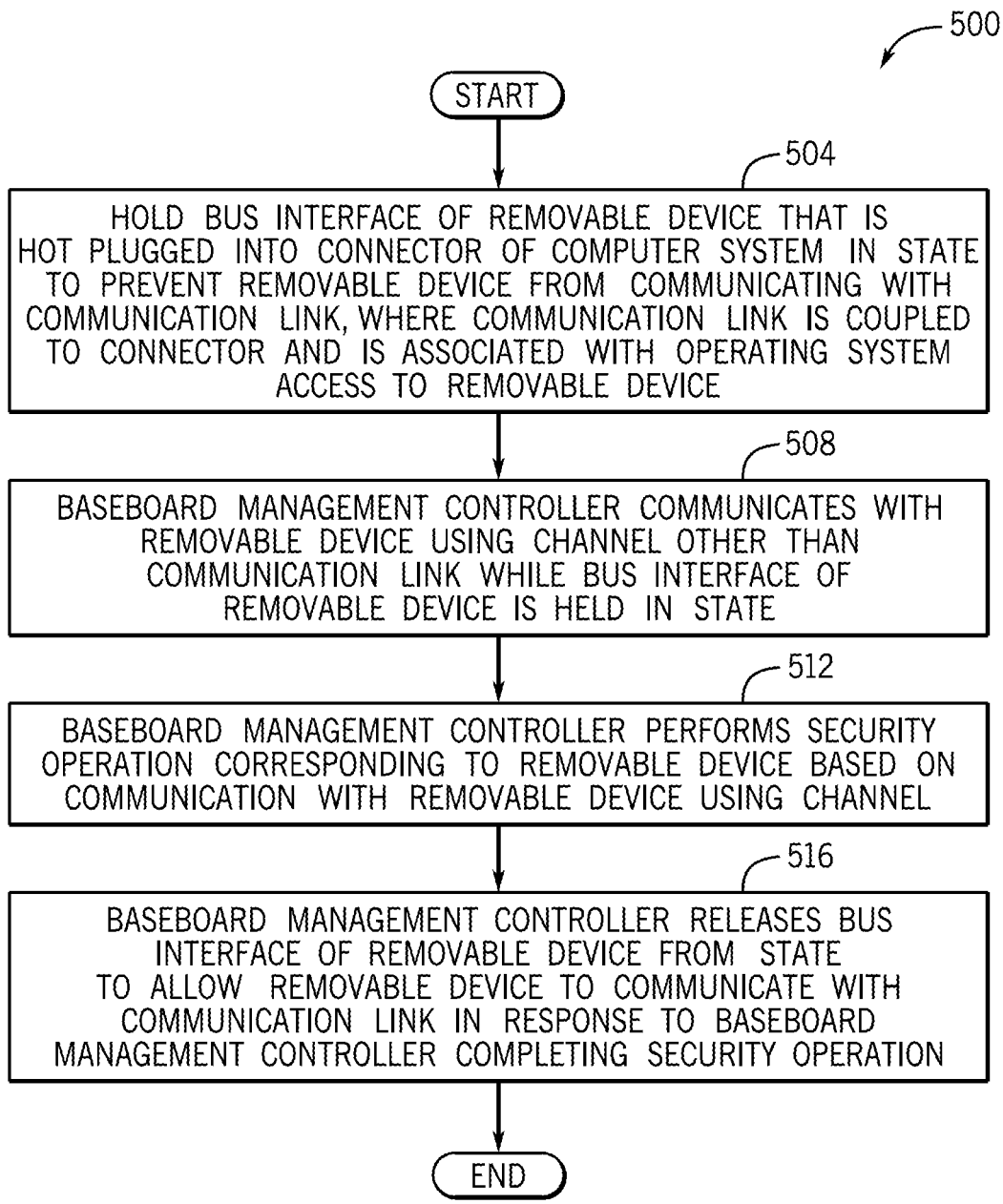
FIG. 5 is a flow diagram depicting a process performed by a baseboard management controller to perform a security operation corresponding to a removable storage device that is hot plugged into a connector of a computer system according to an example implementation.

Referring to FIG. 5, in accordance with example implementations, a technique 500 includes holding (block 504) a bus interface of a removable device that is hot plugged into a connector of a computer system in a state to prevent the removable device from communicating with a communication link. The communication link is coupled to the connector and is associated with operating system access to the removable device. The technique 500 includes a baseboard management controller communicated (block 508) with the removable device using a channel other than the communication link while the bus interface of the removable device is held in the state; and the baseboard management controller performing (block 512) a security operation corresponding to the removable device based on the communication with the device using the channel. The technique 500 includes the baseboard management controller releasing (block 516) the bus interface of the removable device from the state to allow the removable device to communicate with the communication link in response to the baseboard management controller completing the security operation.

Figure 6:
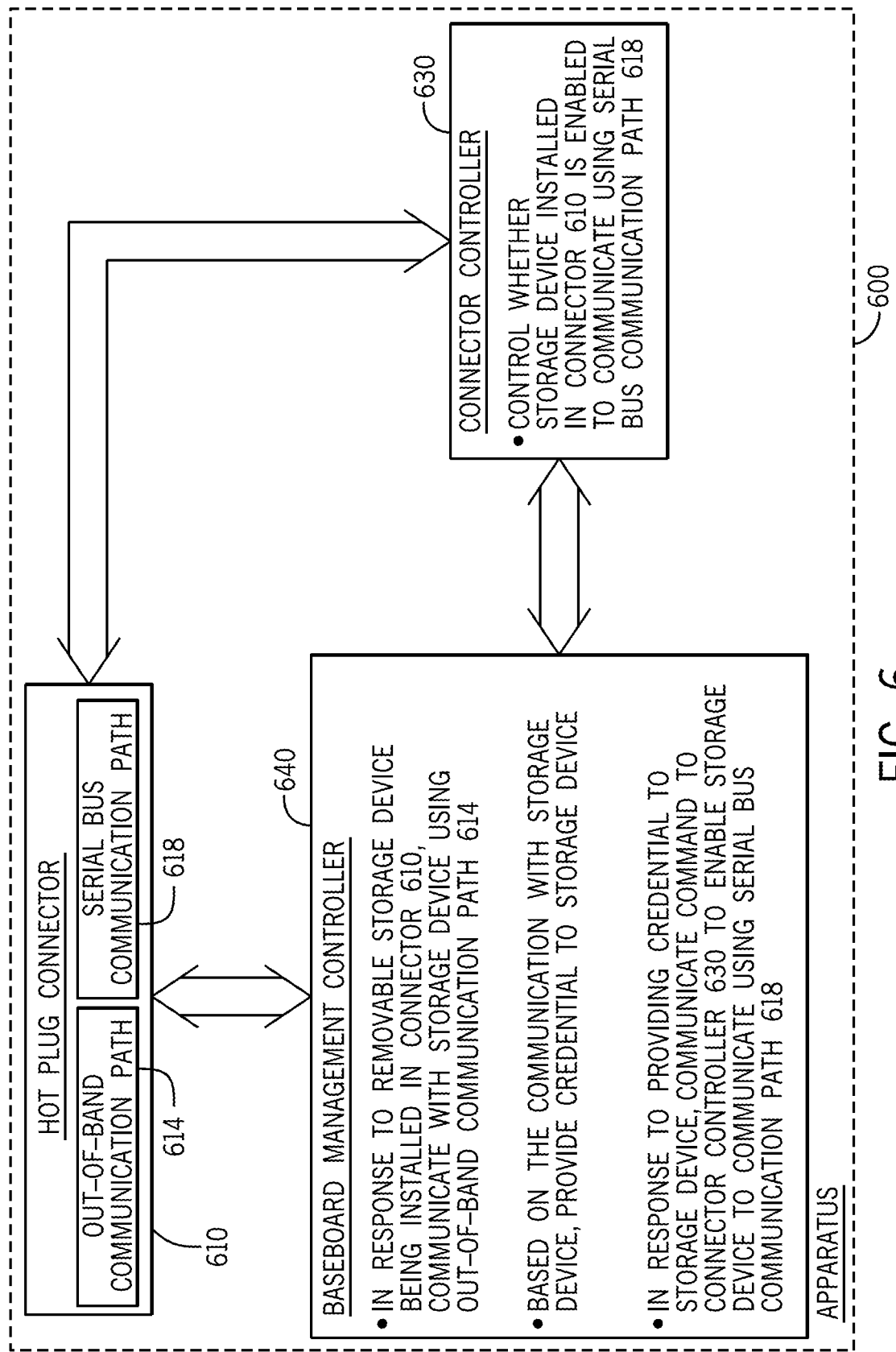
FIG. 6 is a schematic diagram of an apparatus that includes a baseboard management controller to communicate with a removable device installed in a hot plug connector to perform credential management for the storage device according to an example implementation.

Referring to FIG. 6, in accordance with example implementations, an apparatus 600 includes a hot plug connector 610, a connector controller 630 and a baseboard management controller 640. The hot plug connector 610 includes a serial bus communication path 618 and an out-of-band communication path 614. The connector controller 630 is coupled to the hot plug connector 610 to control whether a removable storage device that is installed in the connector 610 is enabled to communicate over the serial bus communication path 618. The baseboard management controller 640, in response to the removable storage device being installed in the hot plug connector 610, communicates with the removable storage device using the out-of-band communication path 614; based on the communication with the removable storage device, provides a credential to the removable storage device; and in response to providing the credential to the removable storage device, communicates a command to the connector controller 630 to enable the removable storage device to communicate using the serial bus communication path 618.

Figure 7:
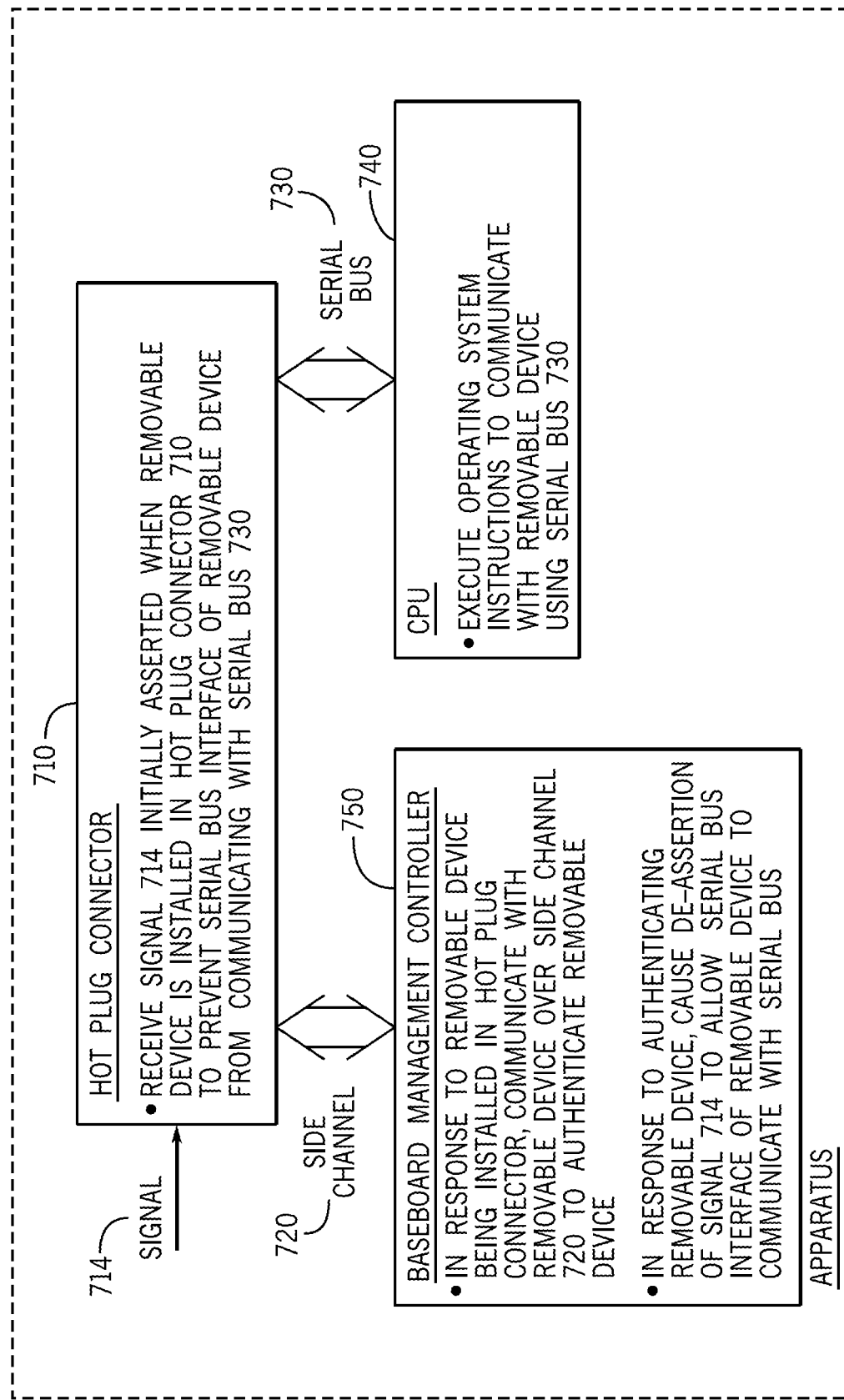
FIG. 7 is a schematic diagram of an apparatus that includes a hot plug connector and a baseboard management controller to communicate with a removable device that is hot plugged into the hot plug connector to authenticate the removable device according to an example implementation.

Referring to FIG. 7, in accordance with example implementations, an apparatus 700 includes a serial bus 730, a side channel 720, a hot plug connector 710, a central processing unit (CPU) 740 and a baseboard management controller 750. The hot plug connector 710 is coupled to the serial bus 730 and the side channel 720. The hot plug connector 710 receives a signal 714 that is initially asserted when a removable device is installed in the hot plug connector 710 to prevent a serial bus interface of the removable device from communicating with the serial bus 730. The CPU 740 executes operating system instructions to communicate with the removable device using the serial bus 730. The baseboard management controller 750, in response to the removable device being installed in the hot plug connector 710, communicates with the removable device using the side channel 720 to authenticate the removable device; and in response to authenticating the removable device, causes de-assertion of the signal 714 to allow the serial bus interface of the removable device to communicate using the serial bus 730.

In accordance with further example implementations, performing the security operation includes performing credential management for the storage device. A potential advantage is that modification of an operating system or creation of an operating system agent may be avoided.

In accordance with further example implementations, the storage device includes a self-encrypting storage drive, and performing credential management includes retrieving a key encrypting key for the self-encrypting storage drive and providing the key encrypting key to the self-encrypting storage drive. A potential advantage is that modification of an operating system or creation of an operating system agent may be avoided.

In accordance with further example implementations, retrieving the key includes the baseboard management controller communicating with a key store that is external to the computer system. A potential advantage is that modification of an operating system or creation of an operating system agent may be avoided.

In accordance with further example implementations, retrieving the key includes the baseboard management controller asserting a system management interrupt to cause the computer system to enter a system management mode and using a system management mode interrupt handler to retrieve the key from a secure store of the computer system. A potential advantage is that modification of an operating system or creation of an operating system agent may be avoided.

In accordance with further example implementations, the storage device includes a self-encrypting storage drive and performing credential management includes determining that a key encrypting key has not been set up for the self-encrypting storage drive and causing the key encrypting key to be generated for the self-encrypting storage drive. A potential advantage is that modification of an operating system or creation of an operating system agent may be avoided.

In accordance with further example implementations, performing the security operation includes the baseboard management controller communicating with the storage device over the channel to authenticate the storage device. A potential advantage is that modification of an operating system or creation of an operating system agent may be avoided.

In accordance with further example implementations, holding the bus in the state includes asserting a signal received by the storage device, where the asserted signal prevents the bus interface of the storage device from performing link training on the communication link. A potential advantage is that modification of an operating system or creation of an operating system agent may be avoided.

In accordance with further example implementations, holding the bus interface in the state includes controlling a signal that is associated with a delay to allow power and clock stabilization after a hot plug event. A potential advantage is that modification of an operating system or creation of an operating system agent may be avoided.

In accordance with further example implementations, performing the security operation includes the baseboard management controller searching for a key for the removable device; in response to the baseboard management controller being unable to find the key for the removable device, the baseboard management controller communicating with a management server to inform the management server that the baseboard management controller is unable to find the key; and the baseboard management controller communicating with the management server to retrieve the key for the removable device. The key is entered through a user interface of the management server. A potential advantage is that a user may intervene through a user interface of the management server to provide the key for the removable device and keep the removable device from being powered down.

In accordance with further example implementations, the baseboard management controller prevents communication between the CPU and the storage device until the baseboard management controller authenticates the storage device. A potential advantage is that modification of an operating system or creation of an operating system agent may be avoided.

In accordance with further example implementations, a semiconductor package includes the CPU, and the semiconductor package include a bus interface that is an agent of the serial bus. A potential advantage is that modification of an operating system or creation of an operating system agent may be avoided.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:

holding a bus interface of a removable device that is hot plugged into a connector of a computer system in a state to prevent the removable device from communicating with a communication link, wherein the communication link is coupled to the connector and is associated with operating system access to the removable device;

a baseboard management controller external to the removable device communicating with the removable device using a channel other than the communication link while the bus interface of the removable device is held in the state;

the baseboard management controller performing a security operation corresponding to the removable device based on the communication with the removable device using the channel; and the baseboard management controller releasing the bus interface of the removable device from the state to allow the removable device to communicate with the communication link in response to the baseboard management controller completing the security operation.

2. The method of claim 1, wherein performing the security operation comprises performing credential management for the removable device.

3. The method of claim 2, wherein the removable device comprises a self-encrypting storage drive, and performing the credential management comprises retrieving a key encrypting key for the self-encrypting storage drive and providing the key encrypting key to the self-encrypting storage drive.

4. The method of claim 3, wherein retrieving the key comprises the baseboard management controller communicating with a key store external to the computer system.

5. The method of claim 3, wherein retrieving the key comprises the baseboard management controller asserting a system management interrupt to cause the computer system to enter a system management mode, and using a system management mode interrupt handler to retrieve the key from a secure store of the computer system.

6. The method of claim 2, wherein the removable device comprises a self-encrypting storage drive and performing the credential management comprises determining that a key encryption key has not been set up for the self-encrypting storage drive, and causing the key encryption key to be generated for the self-encrypting storage drive.

7. The method of claim 1, wherein performing the security operation comprises the baseboard management controller communicating with the removable device over the channel to authenticate the removable device.

8. The method of claim 1, wherein holding the bus interface in the state comprises asserting a signal received by the removable device, wherein the asserted signal prevents the bus interface of the removable device from performing link training on the communication link.

9. The method of claim 1, wherein holding the bus interface in the state comprises controlling a signal associated with a delay to allow power and clock stabilization after a hot plug event.

10. The method of claim 1, wherein performing the security operation comprises:

the baseboard management controller searching for a key for the removable device;

in response to the baseboard management controller being unable to find the key for the removable device, the baseboard management controller communicating with a management server to inform the management server that the baseboard management controller is unable to find the key; and the baseboard management controller communicating with the management server to retrieve the key for the removable device, wherein the key is entered through a user interface of the management server.

11. The method of claim 1, wherein the computer system comprises a motherboard, the connector is mounted to the motherboard, and the baseboard management controller is mounted to the motherboard.

* * * * *